United States Patent [19]
Gatto

[11] 3,804,574
[45] Apr. 16, 1974

[54] APPARATUS FOR SIZING SHAPED ARTICLES

[76] Inventor: Charles Gatto, 134 Rome St., Bethpage, N.Y. 11735

[22] Filed: Dec. 7, 1972

[21] Appl. No.: 312,811

[52] U.S. Cl................. 425/388, 264/280, 425/325
[51] Int. Cl............................................ B29c 17/02
[58] Field of Search .......... 425/325, 377, 388, 397; 264/280

[56] References Cited
UNITED STATES PATENTS
3,169,272   2/1965   Maxson............................. 425/377
3,296,661   1/1967   DeMoustier..................... 425/326 R
3,677,676   7/1972   Hegler...................... 425/326 R UX Primary Examiner—R. Spencer Annear
Attorney, Agent, or Firm—Bauer & Amer

[57] ABSTRACT

Apparatus for sizing cellular shaped articles in which a sizing fixture having a continuous sized and shaped passage is mounted within a fluid contained vacuum chamber by having one of a plurality of separable parts thereof secured fluid tight to the inside of the chamber and other parts thereof separably connectible with the secured part and thereby automatically positioned for fluid-tight engagement with and within the chamber.

9 Claims, 6 Drawing Figures

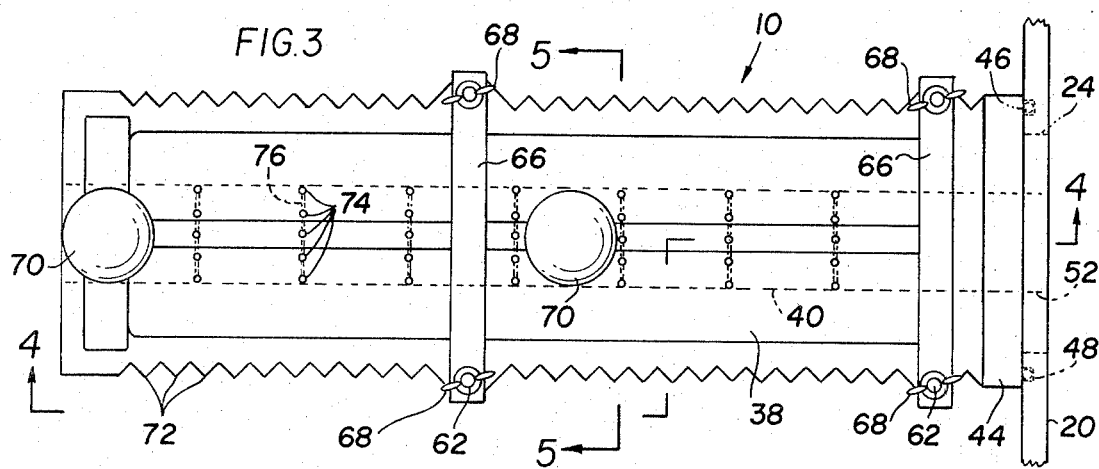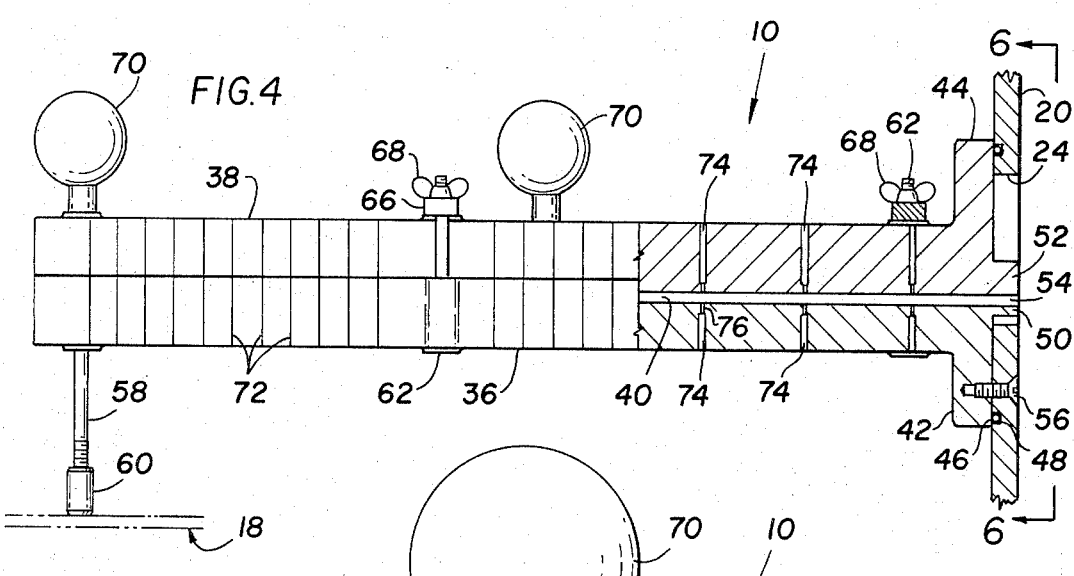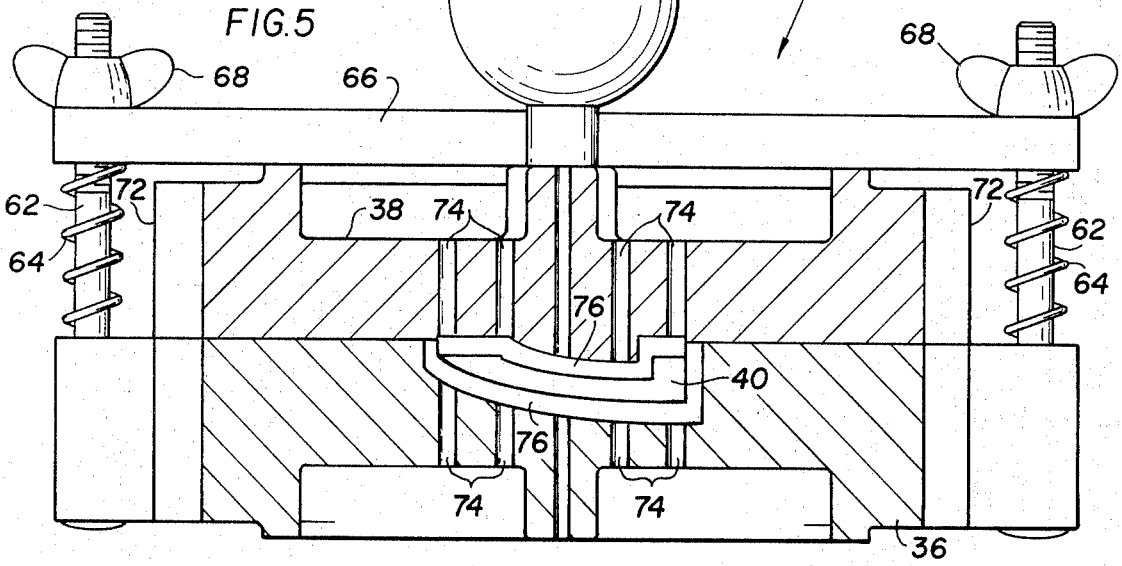

3,804,574

APPARATUS FOR SIZING SHAPED ARTICLES

BACKGROUND OF THE INVENTION

The present invention relates to an apparatus for sizing cellular plastic materials into desired articles of any shape and of continuous lengths.

The extrusion of continuous lengths of plastic materials is generally accomplished in a plastic extruder that includes a die from which hot plastic material issues. The die generally constricts the flow of the plastic material such that as it exudes and issues from the die, it is caused to assume a desired shape and size. However, because hot cellular plastic often tends to expand after leaving the die, it is generally the practice to feed the same to a sizing fixture that is mounted on the exterior of and extends into a cooling chamber. Thus, the plastic extrusion is further caused to maintain or assume its desired end, size and shape by passing it through the sizing fixture that enables its further movement through the cooling chamber. Such an arrangement of structure is exemplified in the United States Letters Pat. No. 3,169,272.

SUMMARY OF THE INVENTION

The desideratum of the present invention is to provide an apparatus for forming plastic articles having desired end sizes and shapes by providing for an arrangement whereby the sizing fixture may be positioned fully within the cooling or vacuum chamber in a fluid-tight manner quickly, easily and effectively without the need for expensive equipment or great technical skill.

Another object and feature of the invention resides in the arrangement of structural details which eliminate the need for large, expensive or cumbersome fluid seals, and enable the assembly of the sizing fixture within the cooling or vacuum chamber without affecting the integrity of existing fluid seals.

Still another object of the invention is to provide a sizing fixture formed in a plurality of parts such that one of the parts may be secured within and in fluid-tight engagement with the cooling chamber and forms a ready support for the rapid and effective fluid-tight assembly of the remaining parts of the sizing fixture.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings, wherein:

FIG. 3 is a plan view of the sizing fixture;

FIG. 4 is a cross-section of FIG. 3 taken along lines 4—4;

FIG. 5 is a cross-section of FIG. 3 taken along lines 5—5; and

Figure 1:
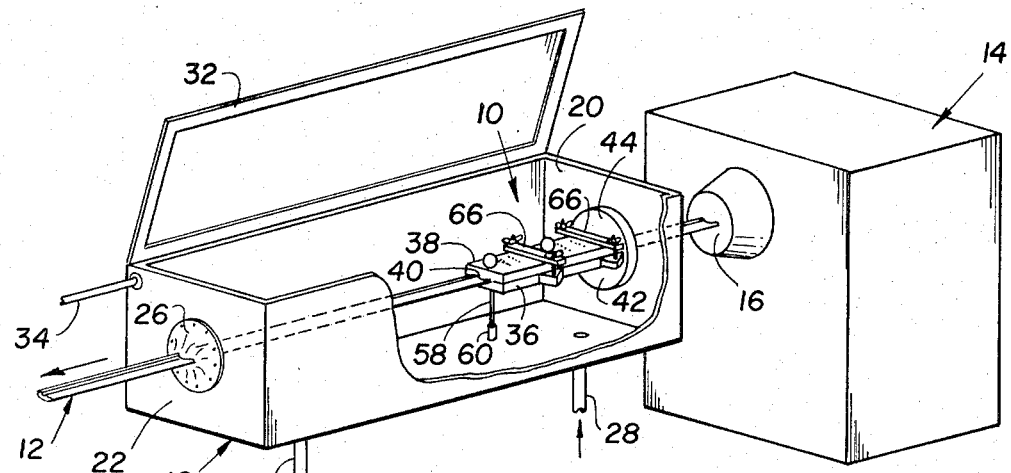
FIG. 1 is a diagrammatic illustration of the apparatus according to the teaching of the invention.
Figure 6:
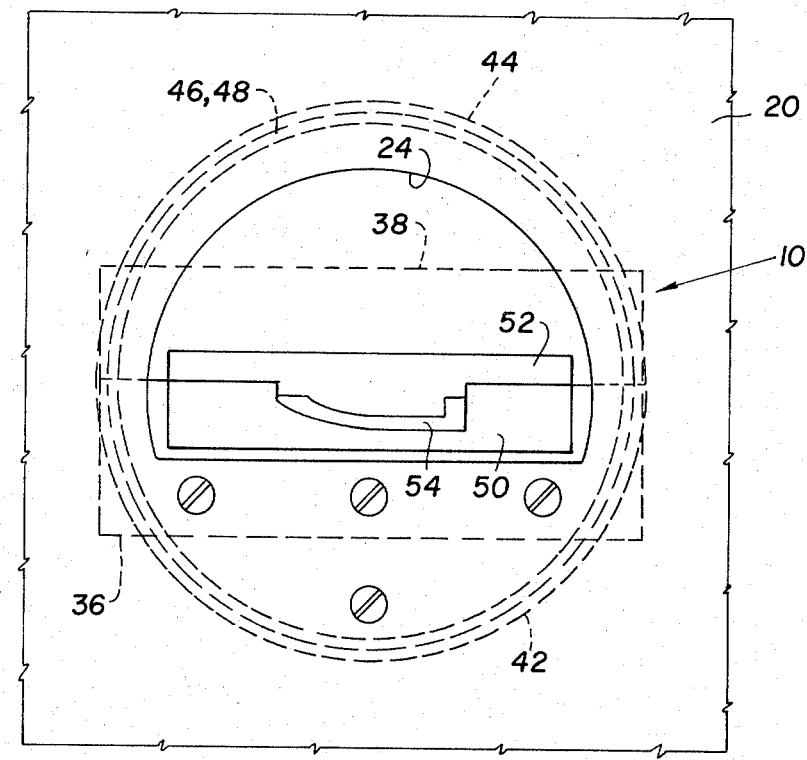
FIG. 6 is an end view as seen in the direction of lines 6—6 of FIG. 4.
Figure 2:
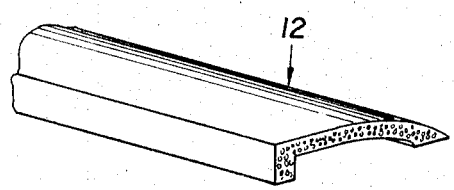
FIG. 2 is a perspective view of a plastic article formed according to the invention.

Referring to the drawings and more particularly to FIG. 1 thereof, the sizing fixture is generally identified by the numeral 10. Much in the manner of the prior art, the sizing fixture 10 is mounted to receive an extruded plastic article generally identified by the numeral 12, one exemplification of which is illustrated in FIG. 2. The extruded plastic shaped article 12 is formed in an extruder generally identified by the numeral 14, the details of which form no part of the present invention. However, as is the practice in the prior art, such extruders usually include an exit die 16 which causes the article 12 to assume the desired initial shape. The completed shaping and sizing of the article is accomplished by the passage of the extruded article 12 through the sizing fixture 10.

In the present invention, the sizing fixture 10 is illustrated as mounted within a fluid-tight vacuum chamber generally identified by the numeral 18. The vacuum chamber 18 may be of any desired construction. The basic details thereof are well known and, therefore, the same form no part of the present invention except insofar as the specific relationship between the sizing fixture 10 and the inlet wall 20 of the chamber 18. As in all such fluid-tight vacuum chambers, the same have an inlet wall 20 and an outlet wall 22, each of which has a respective enlarged inlet opening 24 and outlet opening 26 to facilitate the passage of the extruded article 12 to pass from the extruder 14 through the sizing fixture 10 into the cooling vacuum chamber 18 and outward therefrom at 26.

Referring to the remaining Figures of the drawings, in addition to FIG. 1, the vacuum chamber 18 is provided with a supply of cooling water or other fluid entering at an inlet 28 and exiting therefrom at an outlet 30. A vacuum or negative pressure is applied to the interior of the chamber when the cover 32 thereof is closed. This vacuum may be applied by any convenient means by way of a conduit 34.

In the prior art, it has been the practice to direct the extruded shaped article 12 into a sizing fixture that is mounted on the vacuum chamber 18. The practice has been to mount the sizing fixture as a single unit on the exterior or outer surface of the inlet wall 20 of the vacuum chamber with the remaining portion of the sizing fixture 10 projecting into the chamber through the inlet opening 24. When it became necessary to change the sizing fixture because of a change in the extrusion die 16 for the production and extrusion of a differently sized or shaped plastic article 12, it was necessary to completely slide out to remove the sizing fixture from the inlet opening 24 and then to positively reposition by sliding into place a new sizing fixture from the outside or exterior surface of the wall 20 into the chamber.

This was a cumbersome and time consuming procedure because the chamber contains a cooling fluid and the sealing cooperation between the sizing fixture and the outer surface of the wall 20 was difficult to accomplish. Furthermore, it was found in prior art constructions that the subsequent feeding and introduction of the extruded article 12 into the sizing fixture was extremely difficult because of the need for accurate alignment of the extruded article with such sizing fixture. These procedures required the use of technically skilled personnel not only for the alignment of the sizing fixture with the appurtenant structures of the vacuum chamber 18, but also alignment of the extruded article 12 issuing from the extruder 14 with the internal details of the sizing fixture.

Hence, the present invention was conceived for the purpose of reducing the need for technically skilled personnel to produce an alignment of the extruded article 12 with the internal details of the sizing fixture and to make it easier and more obvious to align the sized and shaped article issuing from the extrusion die 16 with the sizing details of the sizing fixture 10. In addition, the present invention enables a rapid and efficient securement of the sizing fixture to the internal or inner surface of the vacuum chamber wall 20. By constructing the sizing fixture 10 in a plurality of parts, the heretofore cumbersome procedure of aligning the extruded article 12 issuing from the die 16 with the internal sizing and shaping passageway of the sizing fixture 10 is obviated.

In the present invention, the sizing fixture 10 is comprised of a plurality of separable parts, here shown in two parts, 36 and 38. The part 36 may be more conveniently identified as the base whereas the part 38 may be identified as the top. Both the base and the top have a sizing passage 40 formed therein. The details of the passage formed in each of the parts 36 and 38 are complementary so as to complete the size and shape of the article 12. The passage 40 extends for the full length of the sizing fixture 10 in a manner to be described.

Each of the parts 36 and 38 has a complementary radially disposed sealing flange 42 and 44 respectively to fluid-tightly engage with a seal 46 (FIG. 4) mounted within a seat 48 provided within the inner or interior surface of the chamber wall 20. The seal 46 may be an O-shaped ring securely mounted within the seat 48 but removable therefrom in the event the seal ring is damaged and a new one must be substituted therefor. The seal 46 is circumposed about the full extent of the inlet opening 24 in the wall 20 such that when the complementary sealing flanges 42 and 44 of the sizing fixture 10 engage therewith, the inlet opening 24 is fluid-tightly closed as a consequence of the fluid-tight engagement between the flanges of the sizing fixture 10 with the seal 46.

The base of the sizing fixture 10, including the sealing flange 42, is of elongated extent and includes an extension 50 that is adapted to extend into the confines of the inlet opening 24 of the wall 20. This extension 50 cooperating with a similar extension 52 on the top part 38 of the sizing fixture 10 provides an entrance 54 to and elongation of the passage 40 of the sizing fixture and may extend beyond the outside of the chamber 18 to reach as close as possible to the die 16. The base part 36 is adapted to be mounted securely to the inside surface of the wall 20 by any convenient removable securing means or screws 56. When so mounted, the flange 42 thereof is fluid-tightly engaged with the corresponding portion of the fluid seal 46 mounted in the seat 48 of the interior side of the wall 20.

Depending upon the lengthwise extent of the base part 36, the same may be further supported on the bottom wall of the chamber 18 by an adjustable post 58 that may have an adjustment foot 60 threadably mounted thereon. When so mounted against the interior side of the wall 20, the base part 36 provides a guiding support for the extruded article 12 as it issues from the extrusion die 16. The mechanic operating the extruder 14 merely guides the article 12 from the die head 16 through the opening 24 such that the hot, soft, extruded plastic article 12 moves along the respective passage surfaces of the base part 36. As the plastic article continues to issue from the die 16, the lengthwise extent of the plastic 12 is guided to pass outward from the vacuum chamber 18 through the outlet 26 which may include a flexible seal as shown in FIG. 1 of the drawing to prevent the loss of fluid from the chamber 18 and to maintain a vacuum in such chamber.

Thereafter, the top complementary part 38 of the sizing fixture is placed over the base part 36 already fixed in position and properly locating the top part in its required position for operation and to be fluid-tightly sealed against the inside wall 20 of the chamber 18. The placement or positioning of the top part 38 is accomplished quickly and easily simply by aligning its sealing flange 44 with the complementary already secured flange 42 and abutting the respective face of the flange 44 against and into fluid-tight engagement with the remaining exposed portion of the seal 46. Thereafter, the application of locking securing means will maintain the top and base parts 36 and 38 together.

Although many forms of securement means may be provided for the purpose, there is disclosed in the present invention bolts 62 which may be mounted in the base part 36 and extend upwardly beyond the topmost surface of the top part 38. Mounted on the bolts 62 may be lifting springs 64 to aid in the lifting separation of the securement means in the event it is decided or required to remove the top part 38 from the base part 36 at a later time. Cross bars 66 may be applied across the topmost surface of the top part 38 to fit over laterally aligned bolts 62 and to be releasably secured in place by quickly and easily operated wing nuts 68.

To facilitate the manipulation of the top sizing fixture part 38, the same may be conveniently provided with extensions in the form of bulbous hand grips 70 that extend upwardly from the top thereof at at least two points as shown in the drawings. Any number of such hand grips may be provided. The two illustrated in the drawings have been found sufficient for the manipulation of even the largest sizing fixtures.

The present sizing fixture 10 is further unique in that the passage 40 for sizing the plastic article 12 passing therethrough is of substantially the same size and shape throughout the lengthwise extent of the sizing fixture 10. Thus, even at the entranceway 54 to the passage 40, the same continues the size and shape of the remainder of the passage 40. Recognizably, the hot plastic article 12 issuing from the die head 16 and being immediately directed into the entrance 54 and for movement through the passage 40 of the sizing fixture 10 has a tendency to expand during the release of its heat. This expansion is controlled by the present sizing fixture which prevents and limits the expansion to the precise size and shape of the passage 40 defined by the complementary passage surfaces of the top and bottom parts 36 and 38.

To prevent damage to the plastic article 12 passing through the limiting passage 40 and to provide for proper cooling of such article, the parts 36 and 38 are provided with cooling fins 72 along their sides to dissipate the heat from such parts. In addition, cooling fluid is permitted to contact the surfaces of the article 12 as it passes through the passage 40. This is accomplished by providing both the base and top parts 36 and 38 with cooling vents or openings 74. The cooling vents 74 may be in the form of a plurality of laterally aligned holes such as is shown more clearly in FIG. 3. The holes extend from the outer surfaces of the parts 36 and 38 toward the passage 40 and each set of such vents is connected together just short of the passage 40 by an annular groove 76 which encompasses or extends about a lateral portion of the plastic article as it moves lengthwise through the sizing fixture.

Those skilled in the art will recognize that when the vacuum chamber 18 is closed and filled to the proper height with a cooling fluid constantly flowing through the inlet and outlet openings 28 and 30 and encompassing the sizing fixture 10 in such flow, such cooling fluid will come into contact with the moving surface of the plastic article 12 as it moves through the passage 40 of the sizing fixture 10. Inasmuch as the chamber 18 is of the vacuum type, pressure is removed from the surfaces of the article 12 as it moves through the passage 40 and thus the article 12 is permitted to expand to assume the full size and shape permitted by the passage 40. The proper cooling of the article 12 during its movement through the sizing fixture 10 can be controlled to effect a desired appearance and density at the outer surface of the finished plastic article. That is to say, the article 12 such as is shown in FIG. 2 may have an outer surface, the density of which may be controlled by controlling the speed of its movement through the passage 40 and by controlling the cooling effects applied to such article as it moves through such passage.

Where it is desired to provide the article 12 with a dense outer surface and a porous inner surface, such that the end product may resemble and have the density of wood, such as baseboard moulding, the plastic initially applied and used in the extruder 14 may contain a foaming agent. In this way, the extruded article 12 issuing from the die head 16 may be of a highly porous or cellular structure. After passing such porous or cellular article through the passage 40, it has been found that the pores on the outer surfaces of the article 12 may be forced closed and such outer surface will become completely smooth while the density of the pores of the interior of the article 12 shown in FIG. 2 may also be controlled by varying the factors mentioned above.

As a consequence, it will be clear that the present sizing fixture and its manner of securement to the interior surface of the wall 20 of the vacuum chamber 18 provides a quick and easily assembled structure of novel details to enable the production of cellular articles, the density of which and appearance of which may be controlled by varying the speed of the material through the sizing fixture and the cooling effects produced upon such plastic article. Furthermore, by providing the sizing fixture 10 of multi-part construction, the same may be more easily assembled fluid-tightly to and within the cooling chamber and facilitates the initial location of the extruded plastic article therein before the fixture is closed so that the continuous movement of the plastic article in a straight line is more easily effected.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. An apparatus for sizing plastic articles comprising
    a substantially fluid-tight chamber having inlet and outlet walls thereof through which a plastic extrusion is adapted to move,
    said walls having a respective inlet and outlet opening,
    said inlet wall having a seat defined in one side thereof circumposed about said inlet opening,
    a fluid seal in said seat,
    a sizing fixture having at least two separable parts thereof which when assembled together within said chamber automatically fully cover and engage fluid-tightly with said fluid seal,
    means to secure one of said parts to said one side of said inlet wall in continuous fluid-tight covering relation with a portion of said seal,
    means on said one part and the other separable part cooperable to secure said parts together and to position said other part against said one side of said inlet wall in fluid-tight covering relation with the remaining portion of said seal,
    said secured parts of said sizing fixture having a passage defined therein between said inlet and outlet openings and their respective walls.

2. An apparatus for sizing plastic articles as in claim 1,
    said one side of said inlet wall being the interior side of said chamber,
    and said parts of said sizing fixture being secured together to fully cover and define a fluid-tight connection with said seal.

3. An apparatus as in claim 2,
    said sizing fixture passage having an entrance positioned within said inlet opening,
    and said passage being aligned between said inlet and outlet openings.

4. An apparatus for sizing plastic articles as in claim 2,
    said seal being spaced from said fluid inlet opening,
    said parts of said sizing fixture each having a radially disposed sealing flange of sufficient extent to fully cover and form a fluid-tight connection with said seal.

5. An apparatus as in claim 3,
    said passage extending for the length of said sizing fixture and being of substantially the same size and shape for the full extent thereof.

6. An apparatus as in claim 5,
    the size and shape of said passage being substantially that of the finished plastic article with the defining walls of said passage being relatively smooth.

7. An apparatus as in claim 5,
    fluid communicating means defined in said sizing fixture to provide for communication of fluid to and from said passage,
    said fluid communication means being relatively spaced along the extent of said sizing fixture and said passage defined therein.

8. In an apparatus for sizing plastic articles in a substantially fluid-tight chamber,
    an inlet wall forming a part of said chamber,
    an inlet opening defined in and extending through said inlet wall to provide through movement of plastic articles into said chamber,
    a fluid seal positioned about said inlet opening and mounted on the interior side of said inlet wall, a sizing fixture having at least two separable parts each of which combined in assembly fluid-tightly cover said inlet opening and engage said fluid seal on the interior side of said inlet wall, means on one of said parts to releasably secure the same to the interior side of said inlet wall in fluid-tight engagement with said fluid seal, and means on said separable parts to releasably secure the same together to releasably secure the other of said parts in fluid-tight engagement with said fluid seal.

9. In an apparatus as in claim 8, a recess in the interior side of said inlet wall about said inlet opening, said fluid seal being supported in said recess and projecting beyond said interior side of said inlet wall, and said two parts having complemental flanges for fluid-tight engagement with said fluid seal.

* * * * *